(12) United States Patent
Bobbitt et al.

(10) Patent No.: US 8,612,286 B2
(45) Date of Patent: *Dec. 17, 2013

(54) CREATING A TRAINING TOOL

(75) Inventors: Russell Patrick Bobbitt, Pleasantville, NY (US); Quanfu Fan, Somerville, MA (US); Arun Hampapur, Norwalk, CT (US); Frederik Kjeldsen, Poughkeepsie, NY (US); Sharathchandra Umapathirao Pankanti, Darien, CT (US); Akira Yanagawa, New York, NY (US); Yun Zhai, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 739 days.

This patent is subject to a terminal disclaimer.

(21) Appl. No.: 12/262,467

(22) Filed: Oct. 31, 2008

(65) Prior Publication Data

US 2010/0114671 A1    May 6, 2010

(51) Int. Cl.
 *G06Q 10/00* (2012.01)
(52) U.S. Cl.
 USPC .................. 705/7.42; 348/150; 382/155
(58) Field of Classification Search
 USPC .................. 705/7.42; 348/150; 382/155
 See application file for complete search history.

(56) References Cited

U.S. PATENT DOCUMENTS

| | | | |
|---|---|---|---|
| 4,679,077 A | 7/1987 | Yuasa et al. | |
| 4,701,849 A * | 10/1987 | Elden | 705/7.42 |
| 4,991,008 A | 2/1991 | Nama | |
| 5,099,322 A | 3/1992 | Gove | |
| 5,729,471 A | 3/1998 | Jain et al. | |
| 5,745,036 A | 4/1998 | Clare | |
| 5,748,085 A | 5/1998 | Davis et al. | |
| 5,920,338 A | 7/1999 | Katz | |
| 5,965,861 A | 10/1999 | Addy et al. | |
| 6,075,560 A | 6/2000 | Katz | |
| 6,154,149 A | 11/2000 | Tyckowski et al. | |

(Continued)

FOREIGN PATENT DOCUMENTS

| | | |
|---|---|---|
| WO | 2005102175 | 11/2005 |
| WO | WO 2006/105376 A2 | 10/2006 |
| WO | WO 2008/008505 | 1/2008 |
| WO | WO 2008/083869 A1 | 7/2008 |

OTHER PUBLICATIONS

Field evaluation of a new grocery checkstand design P. Spielholz, N Howard, E Carcamo . . . —Applied Ergonomics, 2008—Elsevier.*

(Continued)

*Primary Examiner* — Jonathan G Sterrett
(74) *Attorney, Agent, or Firm* — Ryan, Mason & Lewis, LLP (57) ABSTRACT

Techniques for creating a training technique for an individual are provided. The techniques include obtaining video of one or more events and information from a transaction log that corresponds to the one or more events, wherein the one or more events relate to one or more actions of an individual, classifying the one or more events into one or more event categories, comparing the one or more classified events with an enterprise best practices model to determine a degree of compliance, examining the one or more classified events to correct one or more misclassifications, if any, and revise the one or more event categories with the one or more corrected misclassifications, if any, and using the degree of compliance to create a training technique for the individual.

24 Claims, 7 Drawing Sheets

(56) References Cited

U.S. PATENT DOCUMENTS

| | | | |
|---|---|---|---|
| 6,236,736 B1 | 5/2001 | Crabtree et al. | |
| 6,259,803 B1 | 7/2001 | Wirtz et al. | |
| 6,462,774 B1 | 10/2002 | Bildstein | |
| 6,463,432 B1 | 10/2002 | Murakawa | |
| 6,636,635 B2 | 10/2003 | Matsugu | |
| 6,793,128 B2 | 9/2004 | Huffman | |
| 6,847,393 B2 | 1/2005 | Ashe et al. | |
| 6,871,185 B2 * | 3/2005 | Walker et al. | 705/16 |
| 6,970,810 B1 * | 11/2005 | Matsko | 702/187 |
| 6,998,987 B2 | 2/2006 | Lin | |
| 7,004,382 B2 | 2/2006 | Sandru | |
| 7,028,269 B1 | 4/2006 | Cohen-Solal et al. | |
| 7,080,778 B1 | 7/2006 | Kressin et al. | |
| 7,100,824 B2 | 9/2006 | Ostrowski et al. | |
| 7,130,468 B1 | 10/2006 | Meyer et al. | |
| 7,246,745 B2 | 7/2007 | Hudnut et al. | |
| 7,424,370 B2 | 10/2007 | Sun et al. | |
| 7,295,942 B2 | 11/2007 | Joublin et al. | |
| 7,319,479 B1 | 1/2008 | Crabtree et al. | |
| 7,328,844 B2 | 2/2008 | Workers | |
| 7,448,542 B1 | 11/2008 | Bobbitt et al. | |
| 7,503,490 B1 | 3/2009 | Bobbitt et al. | |
| 7,548,253 B2 | 6/2009 | Kang | |
| 7,562,817 B2 * | 7/2009 | McQueen et al. | 235/383 |
| 7,631,808 B2 | 12/2009 | Kundu et al. | |
| 7,646,745 B2 | 1/2010 | Caldwell et al. | |
| 7,688,349 B2 | 3/2010 | Flickner et al. | |
| 7,733,375 B2 | 6/2010 | Mahowald | |
| 7,751,647 B2 | 7/2010 | Pikaz | |
| 7,817,914 B2 | 10/2010 | Kuberka et al. | |
| 7,822,252 B2 | 10/2010 | Bi et al. | |
| 7,957,565 B1 | 6/2011 | Sharma et al. | |
| 8,019,170 B2 | 9/2011 | Wang et al. | |
| 2002/0044691 A1 | 4/2002 | Matsugu | |
| 2003/0107649 A1 | 6/2003 | Flickner et al. | |
| 2003/0174869 A1 | 9/2003 | Suarez | |
| 2004/0010328 A1 * | 1/2004 | Carson et al. | 700/90 |
| 2004/0064372 A1 | 4/2004 | Freeny, Jr. | |
| 2004/0066966 A1 | 4/2004 | Schneiderman | |
| 2004/0066970 A1 | 4/2004 | Matsugu | |
| 2004/0095477 A1 | 5/2004 | Maki et al. | |
| 2005/0141765 A1 | 6/2005 | Liang et al. | |
| 2005/0146605 A1 | 7/2005 | Lipton et al. | |
| 2005/0162515 A1 | 7/2005 | Venetianer et al. | |
| 2005/0162540 A1 | 7/2005 | Yata | |
| 2005/0265582 A1 | 12/2005 | Buehler et al. | |
| 2006/0072010 A1 | 4/2006 | Haering et al. | |
| 2006/0095317 A1 * | 5/2006 | Brown et al. | 705/11 |
| 2006/0104479 A1 | 5/2006 | Bonch-Osmolovskiy et al. | |
| 2006/0243798 A1 | 11/2006 | Kundu et al. | |
| 2006/0251324 A1 | 11/2006 | Bachmann et al. | |
| 2007/0036395 A1 | 2/2007 | Okun | |
| 2007/0043608 A1 | 2/2007 | May et al. | |
| 2007/0076957 A1 | 4/2007 | Wang et al. | |
| 2007/0174214 A1 | 7/2007 | Welsh et al. | |
| 2007/0236570 A1 | 10/2007 | Sun et al. | |
| 2007/0272734 A1 | 11/2007 | Lipton et al. | |
| 2007/0279494 A1 | 12/2007 | Aman et al. | |
| 2008/0100704 A1 | 5/2008 | Venetianer et al. | |
| 2008/0122926 A1 | 5/2008 | Zhou et al. | |
| 2008/0136910 A1 | 6/2008 | Berkey et al. | |
| 2008/0152232 A1 | 6/2008 | Skans | |
| 2008/0198225 A1 | 8/2008 | Gal et al. | |
| 2009/0040303 A1 | 2/2009 | Finn et al. | |
| 2009/0222354 A1 | 9/2009 | Murphy et al. | |
| 2009/0290802 A1 | 11/2009 | Hua et al. | |

OTHER PUBLICATIONS

Survey of ergonomic features of supermarket cash registers [PDF] from unipi.grA Shinnar, J Indelicato, M Altimari . . . —. . . of industrial ergonomics, 2004—Elsevier.*

EMGT 835 Field Project: A Labor Measurement Structure for Retail Operations [PDF] from ku.eduJD VonAchen—2006—kuscholarworks.ku.edu.*

Industrial workstation design: A systematic ergonomics approach [PDF] from osu.edu B Das . . . —Applied Ergonomics, 1996—Elsevier.*

Integrating Ergonomics in the Design Process: A Practical Case Study [PDF] from lboro.ac.uk D Hitchcock, V Haines . . . —The Design Journal, 2004—ingentaconnect.com.*

Universal design of a future grocery retail checkstand [PDF] from gatech.eduCA Vargas—2008—etd.gatech.edu.*

Redesign and Evaluation of the Grocery Store Self-Checkout Systems from Universal Design Perspectives. [PDF] from ncsu.eduK Bajaj—2003—repository.lib.ncsu.edu.*

Unsupervised Event Detection in Videos a Mustafa . . . —Tools with Artificial Intelligence, 2007. ICTAI 2007 . . . —ieeexplore.ieee.org.*

Packing products for customers:: An ergonomics evaluation of three supermarket checkouts C Carrasco, N Coleman, S Healey . . . —Applied Ergonomics, 1995—Elsevier.*

[PDF] Ergonomic Evaluation of Grocery Checkstands [PDF] from washington.eduL Winnemuller . . . —University of Washington—. . . , 2003—depts.washington.edu.*

"Repetitive motion analysis: segmentation and event classification" CM Lu, NJ Ferrier—Pattern Analysis and Machine Intelligence, . . . , 2004—ieeexplore.ieee.org.*

Office Action dated Sep. 29, 2010 for U.S. Appl. No. 12/262,458, filed Oct. 31, 2008, titled, Using Detailed Process Information at a Point of Sale, pp. 1-11.

Notice of Allowance dated Feb. 7, 2011 for U.S. Appl. No. 12/262,458, filed Oct. 31, 2008, titled, Using Detailed Process Information at a Point of Sale, pp. 1-6.

Harasse et al., Automated Camera Dysfunction Detection, 2004, retrieved from http://ieeexploreieee.org/stamp/stamp.jsp?tp=&arnumber=1300940 pp. 1-5.

* cited by examiner

CREATING A TRAINING TOOL

CROSS-REFERENCE TO RELATED APPLICATIONS

The present application is related to U.S. patent application Ser. No. 12/262/454 entitled "Generating an Alert Based on Absence of a Given Person in a Transaction," and filed concurrently herewith, the disclosure of which is incorporated by reference herein in its entirety.

Additionally, the present application is related to U.S. patent application Ser. No. 12/262,458 entitled "Using Detailed Process Information at a Point of Sale," and filed concurrently herewith, the disclosure of which is incorporated by reference herein in its entirety.

The present application is also related to U.S. patent application Ser. No. 12/262,446 entitled "Automatically Calibrating Regions of Interest for Video Surveillance," and filed concurrently herewith, the disclosure of which is incorporated by reference herein in its entirety.

FIELD OF THE INVENTION

The present invention generally relates to information technology, and, more particularly, to retail loss prevention.

BACKGROUND OF THE INVENTION

Details of the checkout operations logs are useful for educating and monitoring employees, shoppers and managers. Retailers need to ensure that checkout station employees are complying with an enterprise best practices model. With existing approaches, however, these tools are informal and not-scalable. Also, failure to comply with best practices can result in lower throughput, customer dissatisfaction, damage to merchandise, damage to property, cashier and/or customer injury, etc.

A transaction log (TLOG) can be monitored to guess or estimate a degree of compliance (for example, one can analyze actual scans per minute versus ideal scans per minute). However, the TLOG does not contain purely visual content (that is, any behavior that does not have a corresponding transactional entry), such as the position or orientation of people around the checkout station.

Also, if a human directly observes the cashier, the cashier's behavior may change as the result of being observed. More problematic is the fact that a supervisor likely has other duties, has a limited ability to maintain sustained attention and cannot observe every cashier at all work hours. Additionally, as the number of lanes to monitor increases, examining all of these events becomes disadvantageously time-consuming.

SUMMARY OF THE INVENTION

Principles of the present invention provide techniques for creating a training tool.

An exemplary method (which may be computer-implemented) for creating a training technique for an individual, according to one aspect of the invention, can include steps of obtaining video of one or more events and information from a transaction log that corresponds to the one or more events, wherein the one or more events relate to one or more actions of an individual, classifying the one or more events into one or more event categories, comparing the one or more classified events with an enterprise best practices model to determine a degree of compliance, examining the one or more classified events to correct one or more misclassifications, if any, and revise the one or more event categories with the one or more corrected misclassifications, if any, and using the degree of compliance to create a training technique for the individual.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus or system including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include hardware module(s), software module(s), or a combination of hardware and software modules.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Principles of the present invention include constructing a training device. In one or more embodiments of the invention, a training device is constructed for a retail checkout environment. By way of illustration, the techniques described herein can include a visually-detailed analysis of checkout events and their automatic comparison with the enterprise or store policies that provide a rich feedback for employee, shopper and/or manager training, education, feedback and/or re-training.

One or more embodiments of the invention use a camera to obtain a detailed description and timing of checkout events, as well as use an enterprise best practices model for comparison. The video is automatically processed, and the resulting video analysis is compared with the enterprise best practices model. Additionally, a human can supervise and/or analyze the automated comparison for base-lining, training, re-training. Further, the techniques detailed herein can be iterated at user preference.

One or more embodiments of the invention can also provide scaleable techniques for evaluating employee compliance with an enterprise best practices model. In contrast to disadvantageous existing approaches that rely on estimation, the techniques described herein includes a layer of visual detail to data mining of a transaction log (TLOG). One or more embodiments of the invention can also incorporate reinforcement learning. Additionally, one or more embodiments of the invention can be implemented specifically within the context of a checkout region in a retail environment, and therefore, for example, one can assume certain characteristics and activities of the scene (for example, cashier work area, register, barcode scanner, etc.).

As described herein, one or more embodiments of the invention include monitoring a checkout area by video camera and using a checkout transaction log instrumented to capture a description of events. Additionally, the techniques detailed herein can include using a model of checkout model events, an enterprise best practices model, a visual analytic engine to analyze video of the checkout, a visual analytic engine to detect checkout events, a visual analytic engine to categorize each detected checkout event as one of the model events, and a visual analytic engine to rate the categorization based on a metric.

One or more embodiments of the invention can also include relating the visual events with the transaction log events, generating a revised transaction log, generating a compliance report based on the enterprise best practices model, and generating a baseline per employee. A human user (for example, a supervisor) can monitor the revised transaction log events steered by categorization metrics, as well as use the discrepancy of statistics of a specific employee to the baseline to train, re-train and/or educate employees, shoppers, and/or managers.

Figure 1:
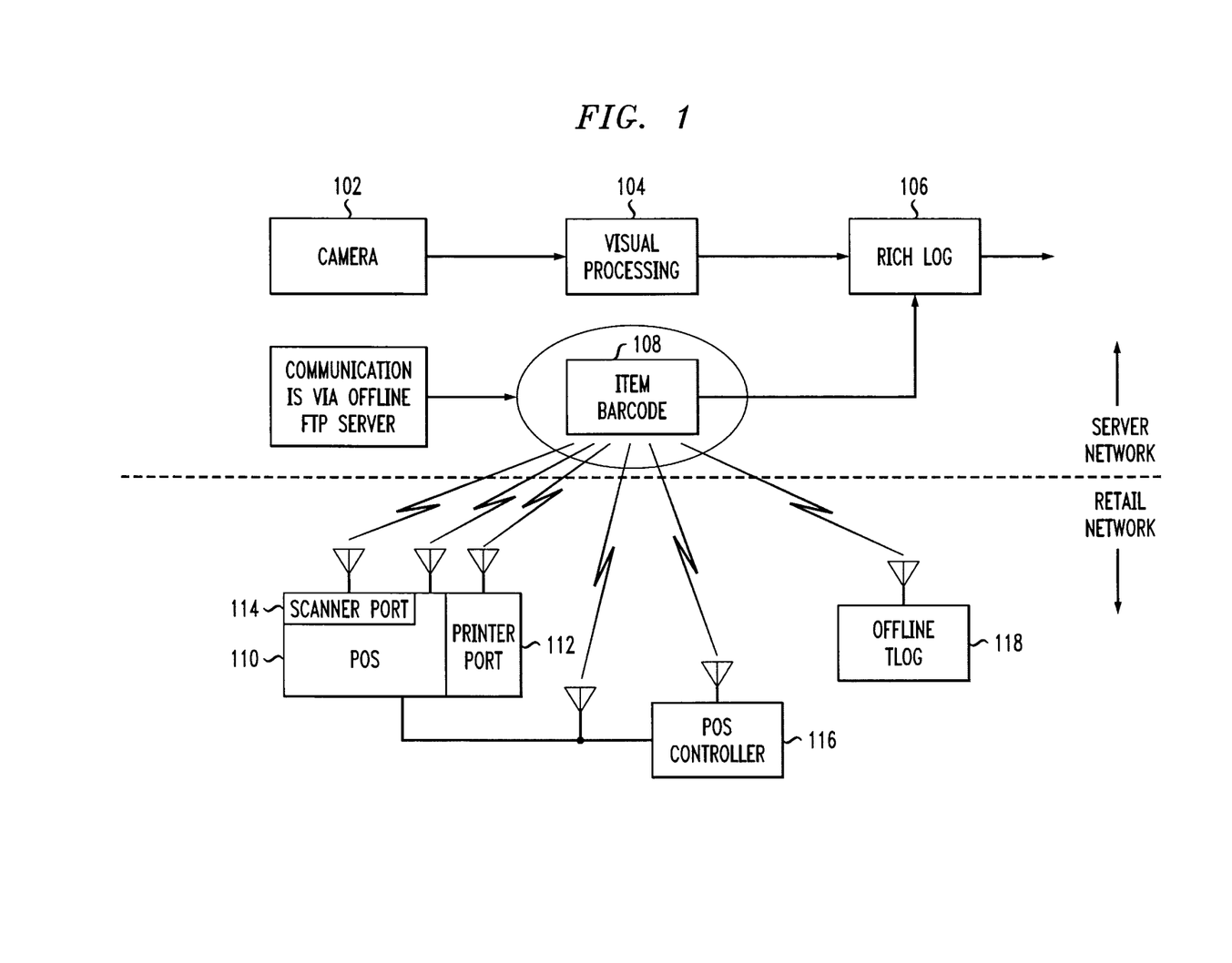
FIG. 1 is a diagram illustrating exemplary architecture, according to an embodiment of the present invention.

FIG. 1 is a diagram illustrating exemplary architecture, according to an embodiment of the present invention. By way of illustration, FIG. 1 depicts a server network and a retail network. The server network includes a camera 102, which feeds to visual processing in step 104, which, along with an item barcode 108, leads to a rich log 106. Also, item barcodes can be obtained from different points in the retail network such as, for example, getting TLOG from a point-of-sale's (POS's) scanner port 114, intercepting and extracting TLOG from the network between POS 110 (which includes a printer port 112) and POS controller 116, and obtaining TLOG from an offline TLOG data repository 118.

Within the context of an ordinary retail checkout environment, a number of processes can occur. For example, a shopper may enter a queue, wait, empty his or her cart/basket, present any pre-transaction material (for example, a loyalty card), scan items, pay for items and leave. Additionally, a cashier may, for example, seek or present identification, wait for the customer to empty his or her cart/basket, load the cash register, unload the cash register, count money, call another cashier, indicate that a lane is active or inactive, call a supervisor, void a transaction and/or item, take payment, seek payment and bag items for a customer. Further, a supervisor may, for example, override a situation.

Figure 2:
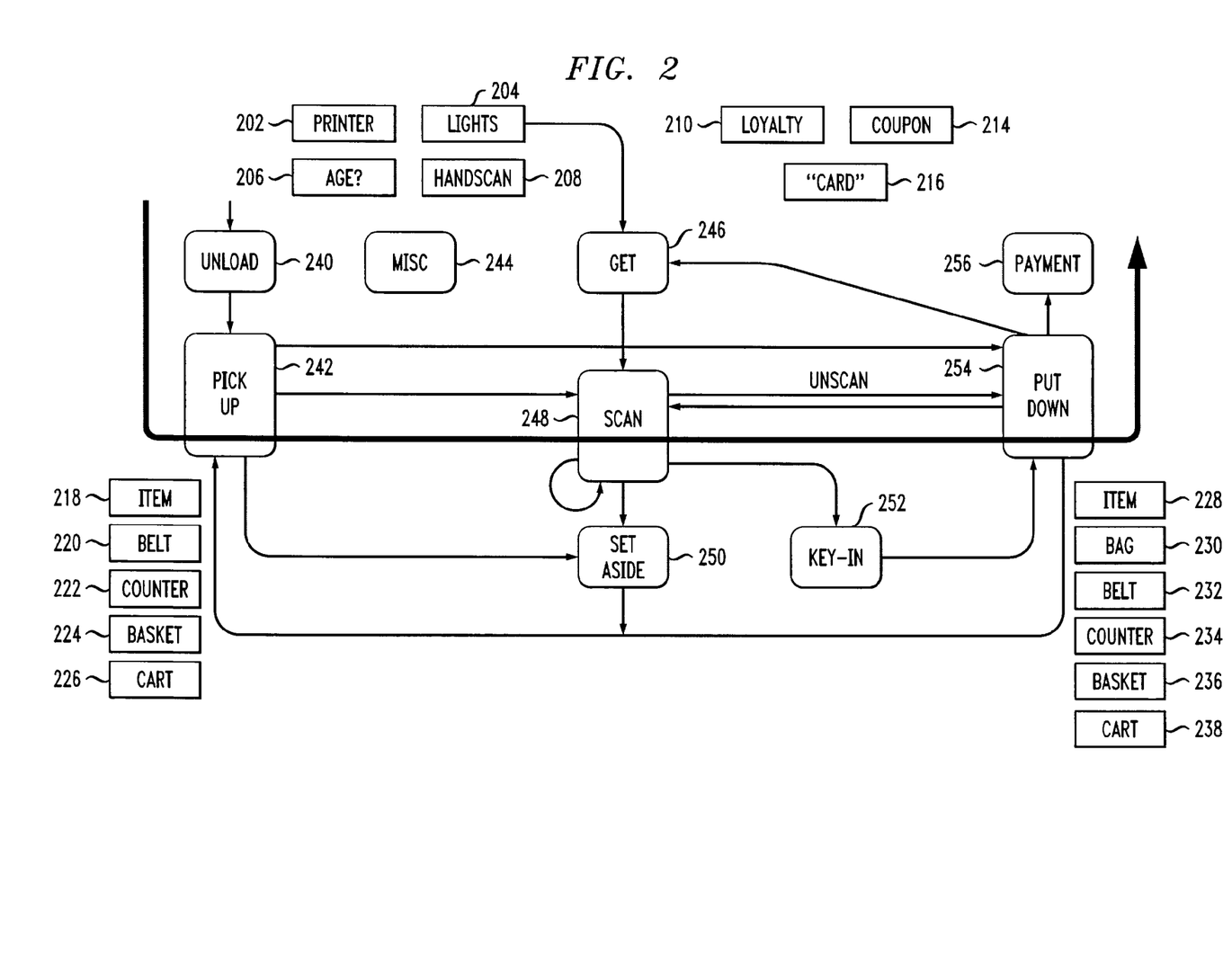
FIG. 2 is a diagram illustrating an exemplary retail checkout progression, according to an embodiment of the present invention.

FIG. 2 is a diagram illustrating an exemplary retail checkout progression, according to an embodiment of the present invention. By way of illustration, FIG. 2 depicts components such as a printer 202, lights 204, an age verification element 206, a hand-scan 208 and other miscellaneous elements 244 (for example, a hard-tag remover (often in apparel stores), a demagnetizer (high-end electronics stores), a radio-frequency identification (RFID) receiver, etc.). Also, at the beginning of the progression, a customer may unload in step 240 an item 218 onto a belt 220 or counter 222 from his or her basket 224 or cart 226, and a cashier or employee may pickup in step 242 the item 218 from the belt 220 or counter 222. The cashier or employee, at this stage, may also set aside an item in step 250.

Additionally, the cashier or employee, in step 246, may get a loyalty item 210, a coupon 214 and/or one or more types of cards 216 from the customer. The cashier or employee can also scan an item in step 248 and/or key-in information into the register in step 252. Further, in step 254, the cashier or employee can put down an item 228 onto a belt 232 or counter 234, and/or into a bag 230, a basket 236 and/or cart 238. Also, the cashier or employee can seek payment from the customer in step 256.

Figure 3:
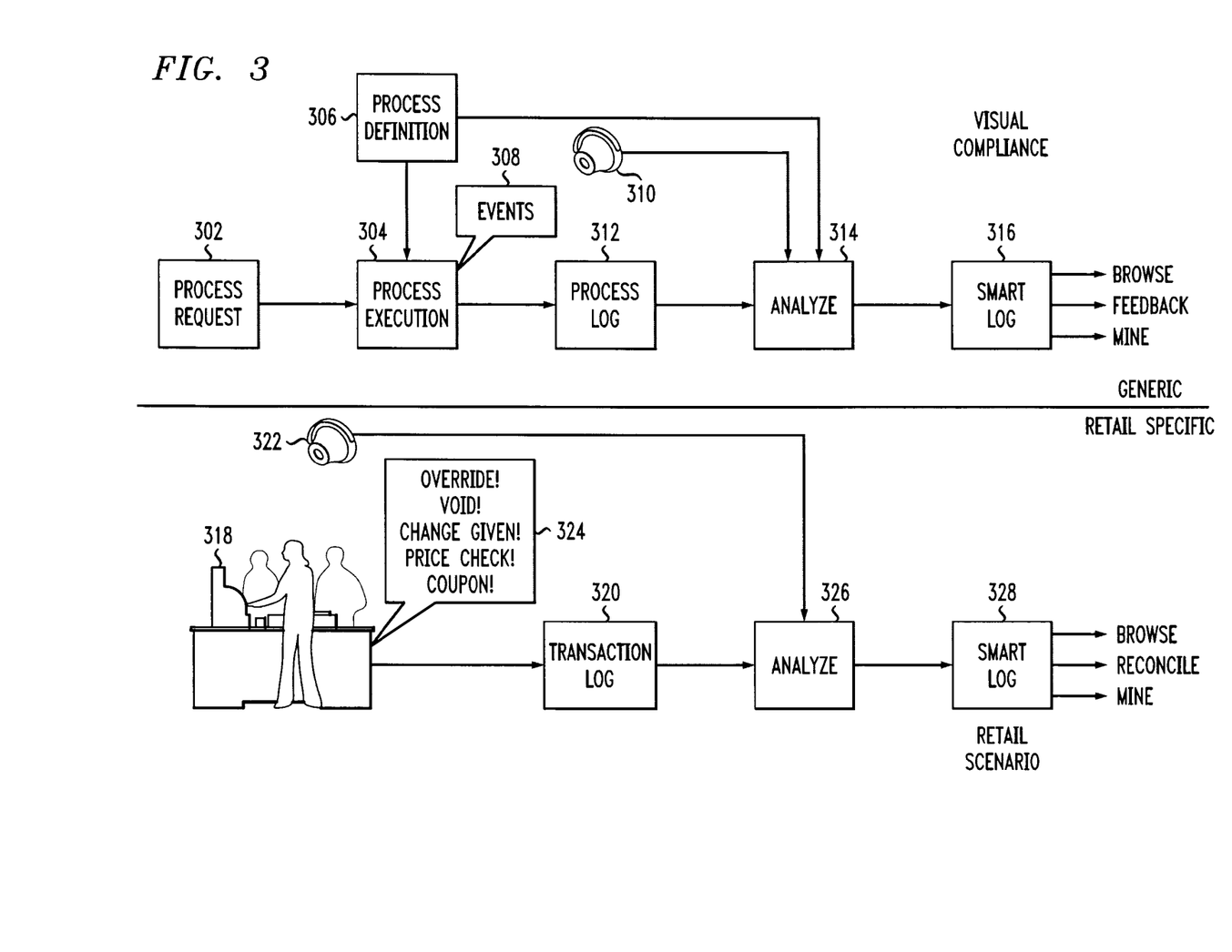
FIG. 3 is a diagram illustrating an exemplary physical architecture overview, according to an embodiment of the present invention.

FIG. 3 is a diagram illustrating an exemplary physical architecture overview, according to an embodiment of the present invention. By way of illustration, FIG. 3 depicts steps that can take place in a generic setting and steps that can occur in a retail specific setting. As illustrated in FIG. 3, a generic setting can include obtaining a process request in step 302, obtaining a process definition in step 306 and performing a process execution in step 304, which can include identifying events (for example, indicators or co-indicators of behaviors) in step 308. A generic setting can also include a camera 310.

Additionally, a generic setting can include creating a process log in step 312, analyzing the process in step 314 and creating a smart log in step 316, wherein the smart log can have capabilities such as, for example, browsing, providing feedback and mining.

A retail specific setting can include a point-of-sale station 318, which can produce events in step 324 such as, for example, override, void, change given, price check and coupon. A retail specific setting can also include a camera 322. Further, one can create a transaction log (TLOG) in step 320, analyze the transaction in step 326 and created a smart log in step 328, wherein the smart log can have capabilities such as, for example, browsing, reconciling data and mining.

Figure 4:
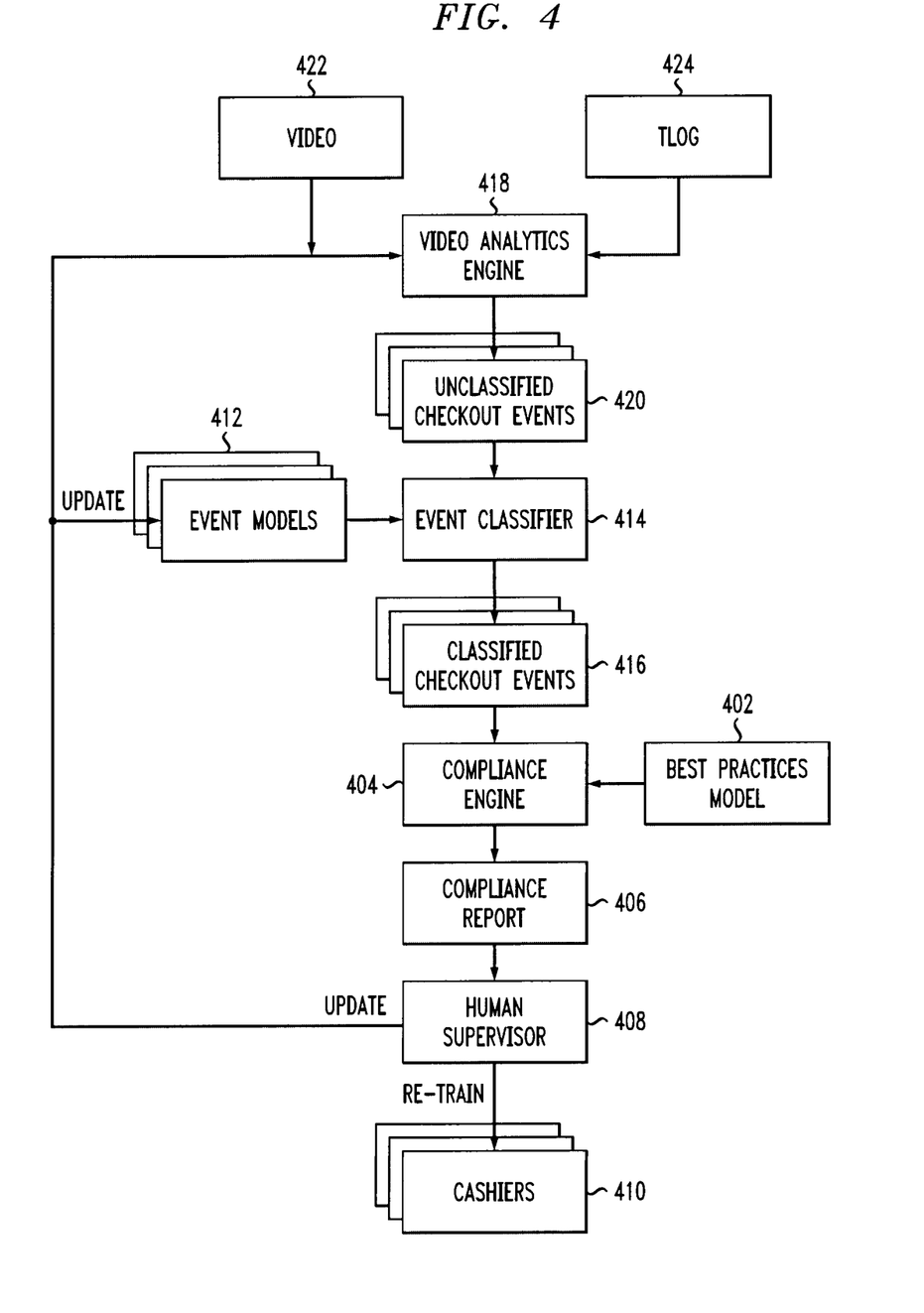
FIG. 4 is a diagram illustrating a system for creating a training technique for an individual, according to an embodiment of the present invention.

FIG. 4 is a diagram illustrating a system for creating a training technique for an individual, according to an embodiment of the present invention. By way of illustration, FIG. 4 depicts a best practices model 402, a compliance engine 404, a compliance report 406, a human supervisor 408 and cashiers 410. FIG. 4 also depicts event models 412, an event classifier 414 and classified checkout events 416. Additionally, FIG. 4 depicts a video analytics engine 418, unclassified checkout events 420, video 422 and a TLOG 424.

Based on video 422 and TLOG 424 input, the video analytics engine 418 outputs a set of unclassified events 420. Each event is a collection of low-level features such as, for example, shape, color, texture, location, orientation, area, motion characteristics, edges, etc. The event classifier 414 classifies the events based on its current set of event models 412 and outputs a set of classified checkout events 416 (for example, a person present in cashier area, a barcode scanned, multiple people present in customer area, transaction voided, etc.).

The compliance engine 404 analyzes the classified events 416 and determines their degree of compliance based on a best practices model 402. A compliance report 406 is generated that indicates each individual's degree of compliance. A human supervisor 408 can examine the report and decides on re-training techniques for selected individuals (such as, for example, cashiers 410). The supervisor 408 also has the ability to correct misclassifications and update the event models 412 and video analytics engine 418 according to the corrections.

Figure 5:
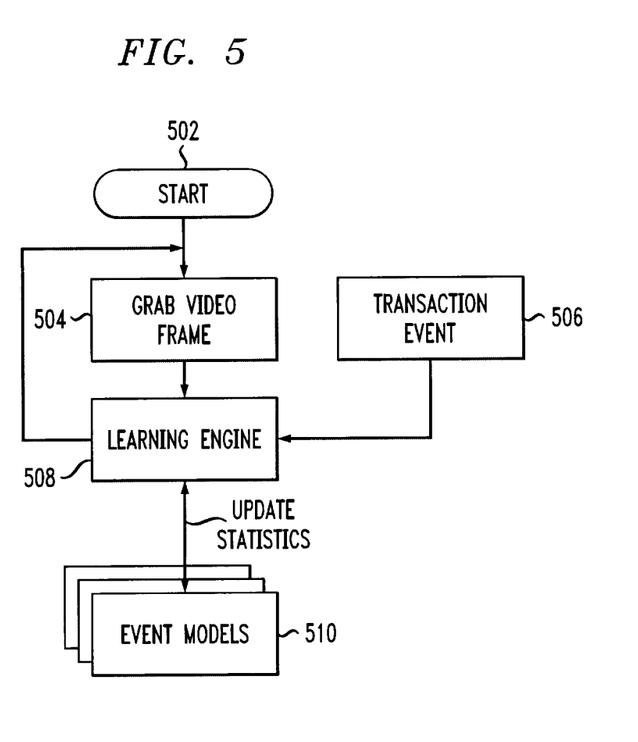
FIG. 5 is a diagram illustrating a statistical learning technique in the initialization phase, according to an embodiment of the present invention.

FIG. 5 is a diagram illustrating a statistical learning method in the initialization phase, according to an embodiment of the present invention. By way of illustration, FIG. 5 depicts starting in step 502, grabbing a video frame in step 504, importing a transaction event in step 506. Also, FIG. 4 depicts a learning engine 508 as well as event models 510. The learning engine 508 iteratively grabs video frames from a video source and receives transaction events as they are produced and updates the statistical event models 510. This process can proceed until such a time that the event models 510 are considered stable enough for use in the overall system. Note, also, that the learning phase can continue, by way of example, in conjunction with reinforcement learning with a human monitor involved.

Figure 6:
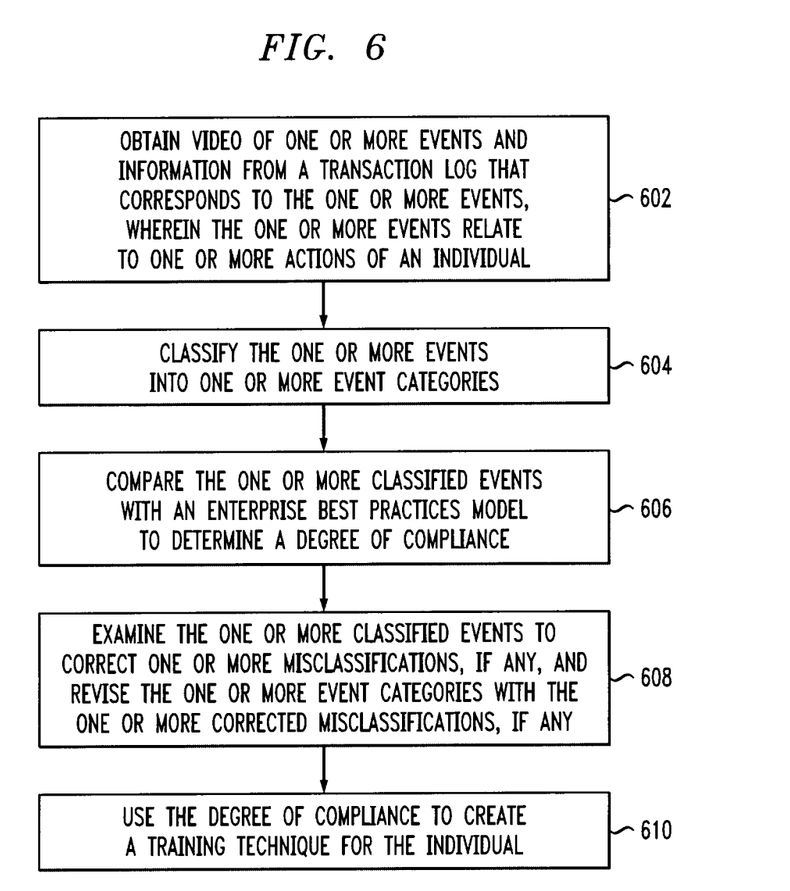
FIG. 6 is a flow diagram illustrating techniques for creating a training technique for an individual, according to an embodiment of the present invention.

FIG. 6 is a flow diagram illustrating techniques for creating a training technique for an individual (for example, an employee), according to an embodiment of the present invention. Step 602 includes obtaining video of one or more events and information from a transaction log that corresponds to the one or more events, wherein the one or more events relate to one or more actions of an individual. Obtaining video of events and information from a transaction log that corresponds to the events can include inputting the video and transaction log information into a video analytics engine, wherein the video analytics engine outputs a set of unclassified events. Each of the events includes a collection of one or more features such as, for example, shape, color, texture, location, orientation, area, one or more motion characteristics, edges, optical flow, color statistics, spatial gradient, temporal gradient, temporal texture, object locations, object trajectories, etc.

Step 604 includes classifying the one or more events into one or more event categories. The event categories can include, by way of example, a person present in cashier area, a barcode scanned, multiple people present in customer area, transaction voided, a person present in customer area, multiple people present in cashier area, a keyboard interaction, one or more items bagged, a pick-up motion, a scan motion and a drop motion, etc. Step 606 includes comparing the one or more classified events with an enterprise best practices model to determine a degree of compliance. Step 608 includes examining the one or more classified events to correct one or more misclassifications, if any, and revise the one or more event categories with the one or more corrected misclassifications, if any.

Step 610 includes using the degree of compliance to create a training technique for the individual. Using the degree of compliance to create a training technique for the individual can include a human supervisor examining the degree of compliance to create a training technique for the individual. Further, one or more embodiments of the invention include automatically learning one or more statistical models of one or more model events (for example, during a user-determined time period following system initialization and subsequently adjusted by a human monitor).

By way of example only, one or more embodiments of the invention can include the following scenarios. The system described herein can detect that an employee is not using a chair at his or her workstation, resulting in the employee remaining standing for a long period of time, which could possibly result in injury. As a result, the employee is informed about the availability of seating, the types of injuries that can result, and is informed to use seating. Also, the system described herein can detect that an employee has slower than normal throughput, resulting in non-optimal customer wait times. An investigation reveals that the employee is not using the standard two-handed scanning technique. As a result, the technique is taught to the employee. Further, the system described herein can detect that a cash drawer is often open when an employee is not present at the register. As a result, the employee is informed that the cash drawer should never be left unattended.

The techniques depicted in FIG. 6 can also include generating a compliance report that indicates the degree of compliance for each individual. Additionally, one or more embodiments of the invention can include rating the classification of the events based on a metric, correcting a misclassification of an event, using the correction to update the generating a revised transaction log. By way of example, one or more embodiments of the invention can include using a metric that measures the degree of similarity or dissimilarity of an unclassified event to event models to classify the event as one of the model events or optionally placing the event into a reject category (that is, it is not similar enough to any event models). Also, one can use a metric to classify an event within class ranking of the event according to how well the event fits the model. Classification techniques to determine these similarities or dissimilarities can include, by way of example and not limitation, nearest class mean, nearest neighbors, artificial neural nets, support vector machine, Bayesian classification, etc.

Additionally, a revised TLOG can include transactional (for example, barcode scanned, item voided, manager override, lane opened, etc.) and visual events (for example, scan motion, customer present, cashier present, multiple people present in cashier area, etc.). The revised TLOG can be input for a higher level process, such as a data mining engine, that analyzes the log based on additional input (for example, an enterprise best practices model). By way of example, in FIG. 4, an exemplary data mining engine is included in the form of a compliance engine 404.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 7:
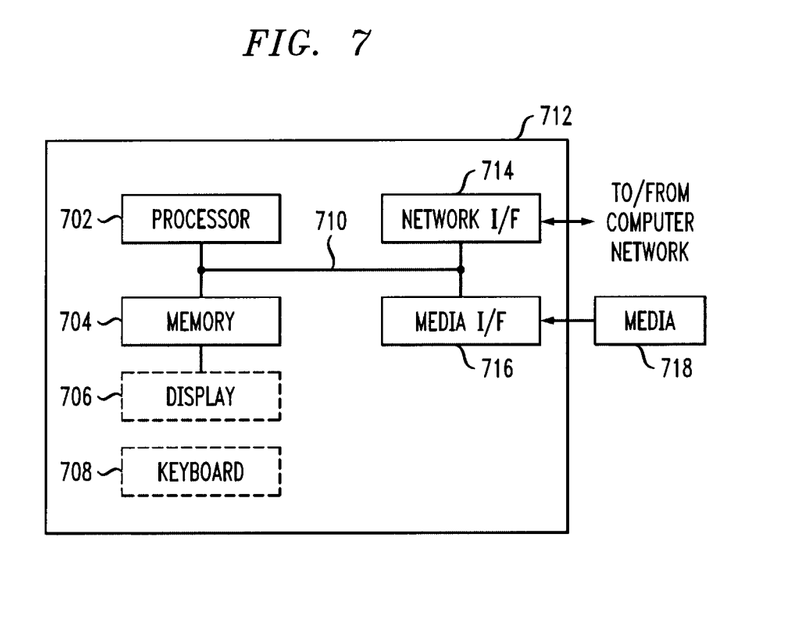
FIG. 7 is a system diagram of an exemplary computer system on which at least one embodiment of the present invention can be implemented.

At present, it is believed that the preferred implementation will make substantial use of software running on a general-purpose computer or workstation. With reference to FIG. 7, such an implementation might employ, for example, a processor 702, a memory 704, and an input and/or output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 702, memory 704, and input and/or output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 718) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 704), magnetic tape, a removable computer diskette (for example, media 718), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 702 coupled directly or indirectly to memory elements 704 through a system bus 710. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, creating a visually-detailed analysis of checkout events and automatically comparing that analysis with enterprise or store policies.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for creating a training technique for an individual at a retail checkout environment, comprising the steps of:
   building an event model for a retail checkout environment, wherein said building an event model comprises:
      iteratively capturing a video frame via a camera associated with the retail checkout environment and importing a concurrent record of a transaction event occurring at the retail checkout environment; and
      corresponding the record of the transaction event with one or more features of the captured video frame to identify the transaction event within the event model;
   obtaining video of one or more events at a retail checkout environment and information from a transaction log that corresponds to the one or more events, wherein one or more events relate to one or more actions of an individual, and wherein obtaining video of one or more events and information from a transaction log that corresponds to the one or more events is carried out by a video analytics engine executing on a hardware processor;
   automatically classifying each of the one or more events into an event category by comparing the obtained video and information from the transaction log to the event model using a classification technique, wherein event categories include a person present in cashier area, a barcode scanned, multiple people present in customer area, transaction voided, a person present in customer area, multiple people present in cashier area, a keyboard interaction, one or more items bagged, a pick-up motion, a scan motion and a drop motion, and wherein automatically classifying the one or more events is carried out by an event classifier executing on a hardware processor;
   examining the one or more classified events to correct one or more misclassifications, if any, and revise the one or more event categories with the one or more corrected misclassifications, if any; and
   automatically generating a report that identifies each classified event and one or more enterprise rules corresponding to the identified classified event wherein generating a report is carried out by a compliance engine executing on a hardware processor.

2. The method of claim 1, wherein obtaining video of one or more events and information from a transaction log that corresponds to the one or more events comprises inputting the video and transaction log information into a video analytics engine, wherein the video analytics engine outputs a set of one or more unclassified events.

3. The method of claim 1, wherein each of the one or more events comprises a collection of one or more features.

4. The method of claim 3, wherein the one or more features comprise at least one of shape, color, texture, location, orientation, area, one or more motion characteristics, one or more edges, optical flow, one or more color statistics, spatial gradient, temporal gradient, temporal texture, one or more object locations and one or more object trajectories.

5. The method of claim 1, further comprising generating a compliance report that indicates the degree of compliance for each individual.

6. The method of claim 1, wherein using the degree of compliance to create a training technique for the individual comprises a human supervisor examining the degree of compliance to create a training technique for the individual.

7. The method of claim 1, further comprising rating the classification of the one or more events based on a metric.

8. The method of claim 1, further comprising automatically learning one or more statistical models of one or more model events.

9. The method of claim 1, further comprising generating a revised transaction log.

10. A computer program product comprising a tangible computer readable recordable storage device having computer readable program code for creating a training technique for an individual at a retail checkout environment, said computer program product including:
    computer readable program code for building an event model for a retail checkout environment, wherein said building an event model comprises:
        iteratively capturing a video frame via a camera associated with the retail checkout environment and importing a concurrent record of a transaction event occurring at the retail checkout environment; and
        corresponding the record of the transaction event with one or more features of the captured video frame to identify the transaction event within the event model;
    computer readable program code for obtaining video of one or more events at a retail checkout environment and information from a transaction log that corresponds to the one or more events, wherein one or more events relate to one or more actions of an individual;
    computer readable program code for automatically classifying each of the one or more events into an event category by comparing the obtained video and information from the transaction log to the event model using a classification technique, wherein event categories include a person present in cashier area, a barcode scanned, multiple people present in customer area, transaction voided, a person present in customer area, multiple people present in cashier area, a keyboard interaction, one or more items bagged, a pick-up motion, a scan motion and a drop motion;
    computer readable program for examining the one or more classified events to correct one or more misclassifications, if any, and revise the one or more event categories with the one or more corrected misclassifications, if any; and
    computer readable program automatically generating a report that identifies each classified event and one or more enterprise rules corresponding to the identified classified event.

11. The computer program product of claim 10, wherein the computer readable program code for obtaining video of one or more events and information from a transaction log that corresponds to the one or more events comprises computer readable program code for inputting the video and transaction log information into a video analytics engine, wherein the video analytics engine outputs a set of one or more unclassified events.

12. The computer program product of claim 10, further comprising computer readable program code for generating a compliance report that indicates the degree of compliance for each individual.

13. The computer program product of claim 10, wherein the computer readable program code for using the degree of compliance to create a training technique for the individual comprises computer readable program code for a human supervisor examining the degree of compliance to create a training technique for the individual.

14. The computer program product of claim 10, further comprising computer readable program code for rating the classification of the one or more events based on a metric.

15. The computer program product of claim 10, further comprising computer readable program code for generating a revised transaction log.

16. The computer program product of claim 10, further comprising computer readable program code for automatically learning one or more statistical models of one or more model events.

17. A system for creating a training technique for an individual at a retail checkout environment, comprising:
    a memory; and
    at least one processor coupled to said memory and operative to:
        build an event model for a retail checkout environment, wherein said building an event model comprises:
            iteratively capturing a video frame via a camera associated with the retail checkout environment and importing a concurrent record of a transaction event occurring at the retail checkout environment; and
            correspond the record of the transaction event with one or more features of the captured video frame to identify the transaction event within the event model;
        obtain video of one or more events at a retail checkout environment and information from a transaction log that corresponds to the one or more events, wherein one or more events relate to one or more actions of an individual;
        automatically classify each of the one or more events into an event category by comparing the obtained video and information from the transaction log to the event model using a classification technique, wherein event categories include a person present in cashier area, a barcode scanned, multiple people present in customer area, transaction voided, a person present in customer area, multiple people present in cashier area, a keyboard interaction, one or more items bagged, a pick-up motion, a scan motion and a drop motion;
        examine the one or more classified events to correct one or more misclassifications, if any, and revise the one or more event categories with the one or more corrected misclassifications, if any; and
        automatically generate a report that identifies each classified event and one or more enterprise rules corresponding to the identified classified event.

18. The system of claim 17, wherein in obtaining video of one or more events and information from a transaction log that corresponds to the one or more events, the at least one processor coupled to said memory is further operative to input the video and transaction log information into a video analytics engine, wherein the video analytics engine outputs a set of one or more unclassified events.

19. The system of claim 17, wherein the at least one processor coupled to said memory is further operative to generate a compliance report that indicates the degree of compliance for each individual.

20. The system of claim 17, wherein in using the degree of compliance to create a training technique for the individual, the at least one processor coupled to said memory is further operative to enable a human supervisor examining the degree of compliance to create a training technique for the individual.

21. The system of claim 17, wherein the at least one processor coupled to said memory is further operative to rate the classification of the one or more events based on a metric.

22. The system of claim 17, wherein the at least one processor coupled to said memory is further operative to generate a revised transaction log.

23. The system of claim 17, wherein the at least one processor coupled to said memory is further operative to automatically learn one or more statistical models of one or more model events.

24. An apparatus for creating a training technique for an individual at a retail checkout environment, said apparatus comprising:

means for building an event model for a retail checkout environment, said means comprising a module executing on a hardware processor, and wherein said building an event model comprises:

iteratively capturing a video frame via a camera associated with the retail checkout environment and importing a concurrent record of a transaction event occurring at the retail checkout environment; and         corresponding the record of the transaction event with one or more features of the captured video frame to identify the transaction event within the event model;

means for obtaining video of one or more events at a retail checkout environment and information from a transaction log that corresponds to the one or more events, said means comprising a module executing on a hardware processor, and wherein one or more events relate to one or more actions of an individual;

means for automatically classifying each of the one or more events into an event category by comparing the obtained video and information from the transaction log to the event model using a classification technique, said means comprising a module executing on a hardware processor, and wherein event categories include a person present in cashier area, a barcode scanned, multiple people present in customer area, transaction voided, a person present in customer area, multiple people present in cashier area, a keyboard interaction, one or more items bagged, a pick-up motion, a scan motion and a drop motion;

means for examining the one or more classified events to correct one or more misclassifications, if any, and revise the one or more event categories with the one or more corrected misclassifications, if any, said means comprising a module executing on a hardware processor; and     means for automatically generating a report that identifies each classified event and one or more enterprise rules corresponding to the identified classified event, said means comprising a module executing on a hardware processor.

\* \* \* \* \*